(12) United States Patent
Lee et al.

(10) Patent No.: US 8,611,237 B2
(45) Date of Patent: Dec. 17, 2013

(54) METHOD AND APPARATUS FOR IDENTIFYING TYPES AND ACCESS MODES OF NEIGHBOR CELLS IN FEMTOCELL ENVIRONMENT

(75) Inventors: Ok Seon Lee, Suwon-si (KR); Jung Hoon Cheon, Suwon-si (KR); Young Hyun Jeon, Guri-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 425 days.

(21) Appl. No.: 12/592,104

(22) Filed: Nov. 19, 2009

(65) Prior Publication Data
US 2010/0124179 A1 May 20, 2010

(30) Foreign Application Priority Data
Nov. 19, 2008 (KR) .................. 10-2008-0115124

(51) Int. Cl.
*H04L 12/24* (2006.01)
(52) U.S. Cl.
USPC .......................................... 370/252; 370/338
(58) Field of Classification Search
USPC ........................................ 370/328, 338, 252
See application file for complete search history.

(56) References Cited

U.S. PATENT DOCUMENTS

| 8,072,953 | B2* | 12/2011 | Mukherjee et al. ........... 370/338 |
| 8,085,684 | B2* | 12/2011 | Kwon et al. .................. 370/252 |
| 8,107,964 | B2* | 1/2012 | Nylander et al. ............. 455/444 |
| 2007/0097938 | A1 | 5/2007 | Nylander et al. |
| 2009/0047960 | A1* | 2/2009 | Gunnarsson et al. ......... 455/436 |
| 2009/0047968 | A1* | 2/2009 | Gunnarsson et al. ......... 455/446 |
| 2011/0159901 | A1* | 6/2011 | Frenger et al. ............... 455/502 |

FOREIGN PATENT DOCUMENTS

| KR | 10-2008-0045096 | 5/2008 |
| KR | 10-2008-0067512 | 7/2008 |

OTHER PUBLICATIONS

International Search Report dated May 27, 2010 in connection with International Patent Application No. PCT/KR2009/006819.
GSM Association Official Document FCG17_003, "Femtocell Interference and Frequency Version 1.0". May 15, 2008, pp. 1-56.

* cited by examiner

*Primary Examiner* — Ricky Ngo
*Assistant Examiner* — Ben H Liu

(57) ABSTRACT

In a mobile communication system including macro cells and femtocells, a neighbor cell identification method includes: transmitting, by a neighbor cell that is a macro cell or a femtocell, a neighbor cell identifier containing information regarding the type and access mode of the neighbor cell to a user equipment. The user equipment identifies, after receiving the neighbor cell identifier the type and access mode of the neighbor cell. The user equipment also accesses the neighbor cell according to the identification result.

20 Claims, 12 Drawing Sheets

METHOD AND APPARATUS FOR IDENTIFYING TYPES AND ACCESS MODES OF NEIGHBOR CELLS IN FEMTOCELL ENVIRONMENT

CROSS-REFERENCE TO RELATED APPLICATION(S) AND CLAIM OF PRIORITY

The present application is related to and claims priority to an application entitled "METHOD AND APPARATUS FOR IDENTIFYING TYPES AND ACCESS MODES OF NEIGHBOR CELLS IN FEMTOCELL ENVIRONMENT" filed in the Korean Intellectual Property Office on Nov. 19, 2008 and assigned Serial No. 10-2008-0115124, the contents of which are incorporated herein by reference.

TECHNICAL FIELD OF THE INVENTION

The present invention relates generally to identification of types and access modes of neighbor cells and, more particularly, to a method and apparatus that enables a user equipment to identify the types and access modes of neighbor cells on the basis of received neighbor cell identifiers.

BACKGROUND OF THE INVENTION

A femtocell is an indoor cell in a home or office managed by a miniaturized base station that is connected through a broadband link to the core of a mobile communication network. The word 'femtocell' is a compound word formed from the word 'femto' meaning 10-15 and the word 'cell' meaning a coverage area for mobile communication, and refers to a cell having a radius of about 10 m. Femtocell base stations may contribute to extension of indoor cell coverage, enhancement of radio signal quality, and effective delivery of wired and wireless convergence services. Femtocell base stations enable subscribers to receive high-quality data services, and are expected to play a major role in both existing third generation mobile communication systems and next generation mobile communication systems such as 3GPP (The 3rd Generation Partnership Project) LTE (Long Term Evolution). A femtocell has much narrower coverage than a macro cell, and is normally deployed directly by the subscriber at a desired location.

In an environment of macro cells, a user equipment is readily able to identify a particular cell while approaching the cell. However, in an environment where 5000 to 7000 femtocells may be deployed in a unit area of 1 km², a user equipment may have difficulty in identifying whether a neighbor cell is a macro cell or femtocell. Further, as discussed recently, a femtocell may operate in a closed access mode where the femtocell serves only a registered user, in an open access mode where the femtocell serves both a registered user and a non-registered user, or in a hybrid access mode where the closed access mode and open access mode are possible.

Accordingly, it is necessary for a user equipment to identify whether a neighbor cell is a macro cell or a femtocell, and, if the neighbor cell is a femtocell, to identify the access mode of the femtocell.

SUMMARY OF THE INVENTION

To address the above-discussed deficiencies of the prior art, it is a primary object to provide a method and apparatus that identify the type and access mode of a neighbor cell.

The present invention also provides a method and apparatus that enable a user equipment to enter one among plural searched neighbor cells having the highest priority where a femtocell in the closed access mode has priority over a femtocell in the open access mode and a femtocell in the open access mode has priority over a macro cell.

The present invention further provides a method and apparatus wherein, when a user equipment supporting a closed service mode receives an open access service from a femtocell in which the user equipment is registered, the service mode of the user equipment is transitioned to the closed service mode.

In accordance with an exemplary embodiment of the present invention, there is provided a neighbor cell identification method in a mobile communication system including macro cells and femtocells, including: transmitting, by a neighbor cell that is a macro cell or a femtocell, a neighbor cell identifier containing information regarding the type and access mode of the neighbor cell to a user equipment; identifying, after receiving the neighbor cell identifier, by the user equipment, the type and access mode of the neighbor cell; and accessing, by the user equipment, the neighbor cell according to the identification result.

The neighbor cell identifier may be a PCI or GCI whose value range reflects the cell type and access mode. Alternatively, the neighbor cell identifier may be included in system information. Alternatively, the neighbor cell identifier may be a combination of a PCI and CSG indicator. Alternatively, the neighbor cell identifier may be a combination of a PCI and HNB indicator.

In accordance with another exemplary embodiment of the present invention, there is provided a user equipment capable of neighbor cell identification that may receive a neighbor cell identifier from a neighbor cell, identify the type and access mode of the neighbor cell, and access the neighbor cell according to the identification result.

In accordance with another exemplary embodiment of the present invention, there is provided a cell that may produce a cell identifier containing information regarding the type and access mode of the cell, and transmit the cell identifier to a user equipment to enable neighbor cell identification.

In a feature of the present invention, a user equipment can receive cell identifiers broadcast from neighbor cells and identify the types and access modes of the neighbor cells. The user equipment can preferentially enter one of the neighbor cells having the highest priority, and communicate at low cost. In addition, when a user equipment supporting a closed service mode receives an open access service from a femtocell in which the user equipment is registered, the service mode of the user equipment is transitioned to the closed service mode for more adequate services.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts: The features and advantages of the present invention will be more apparent from the following detailed description in conjunction with the accompanying drawings, in which.

DETAILED DESCRIPTION OF THE INVENTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

In the present invention, with respect to a particular user equipment, a femtocell may operate in a closed access mode where the femtocell serves only a registered user, in an open access mode where the femtocell serves both a registered user and a non-registered user, or in a hybrid access mode wherein both the closed access mode and open access mode are possible. In the case when a user equipment accesses a femtocell operating in the hybrid access mode, the user equipment may connect through the open access mode to the femtocell and then transition to the closed access mode if the mobile terminal has registered with the femtocell.

The user equipment identifies the operating mode of a femtocell and also determines whether a neighbor cell is a macro cell or a femtocell.

Next, embodiments of the present invention are described in relation to determining whether a neighbor cell is a macro cell or a femtocell, and to determining whether the found femtocell operates in the open access mode, in the closed access mode or in the hybrid access mode.

The following four embodiments for identifying the access mode of a neighbor cell are described as embodiments of the present invention.

In the first embodiment, the user equipment utilizes a physical cell identity (PCI) reflecting the operating mode or a global cell identifier (GCI) from a neighbor cell as a neighbor cell identifier.

In the second embodiment, the user equipment utilizes a piece of system information as a neighbor cell identifier.

In the third embodiment, the user equipment utilizes a PCI reflecting the operating mode and a CSG indicator in system information block-1 (SIB-1) as a neighbor cell identifier.

In the fourth embodiment, the user equipment utilizes a PCI reflecting the operating mode and a Home enodeB (HNB) indicator as a neighbor cell identifier.

Figure 5:
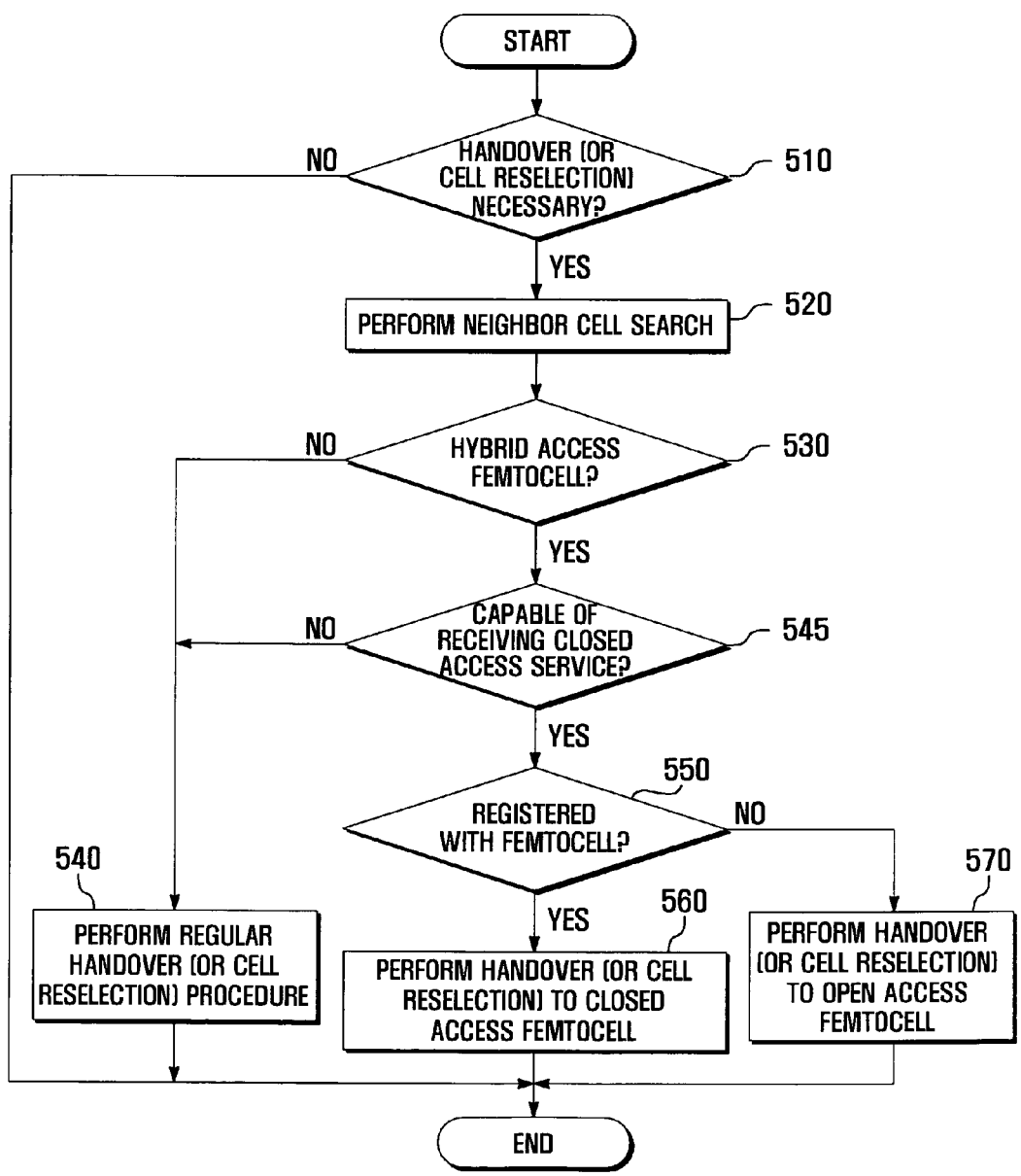
FIG. 5 illustrates a control procedure for a user equipment to access a femtocell.
Figure 6:
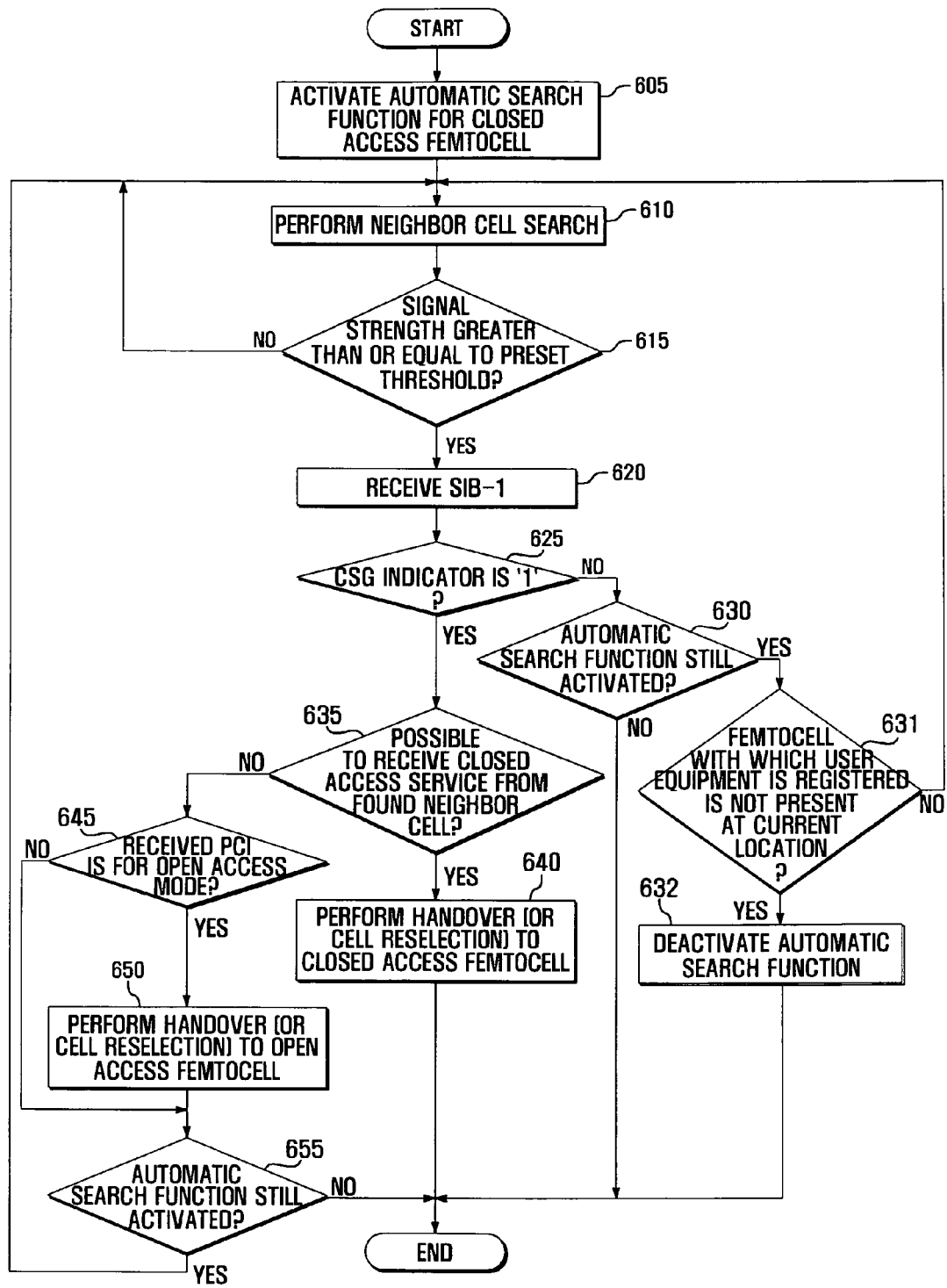
FIG. 6 illustrates a procedure for a user equipment executing an automatic search function to search for a femtocell with which the user equipment is registered.
Figure 7:
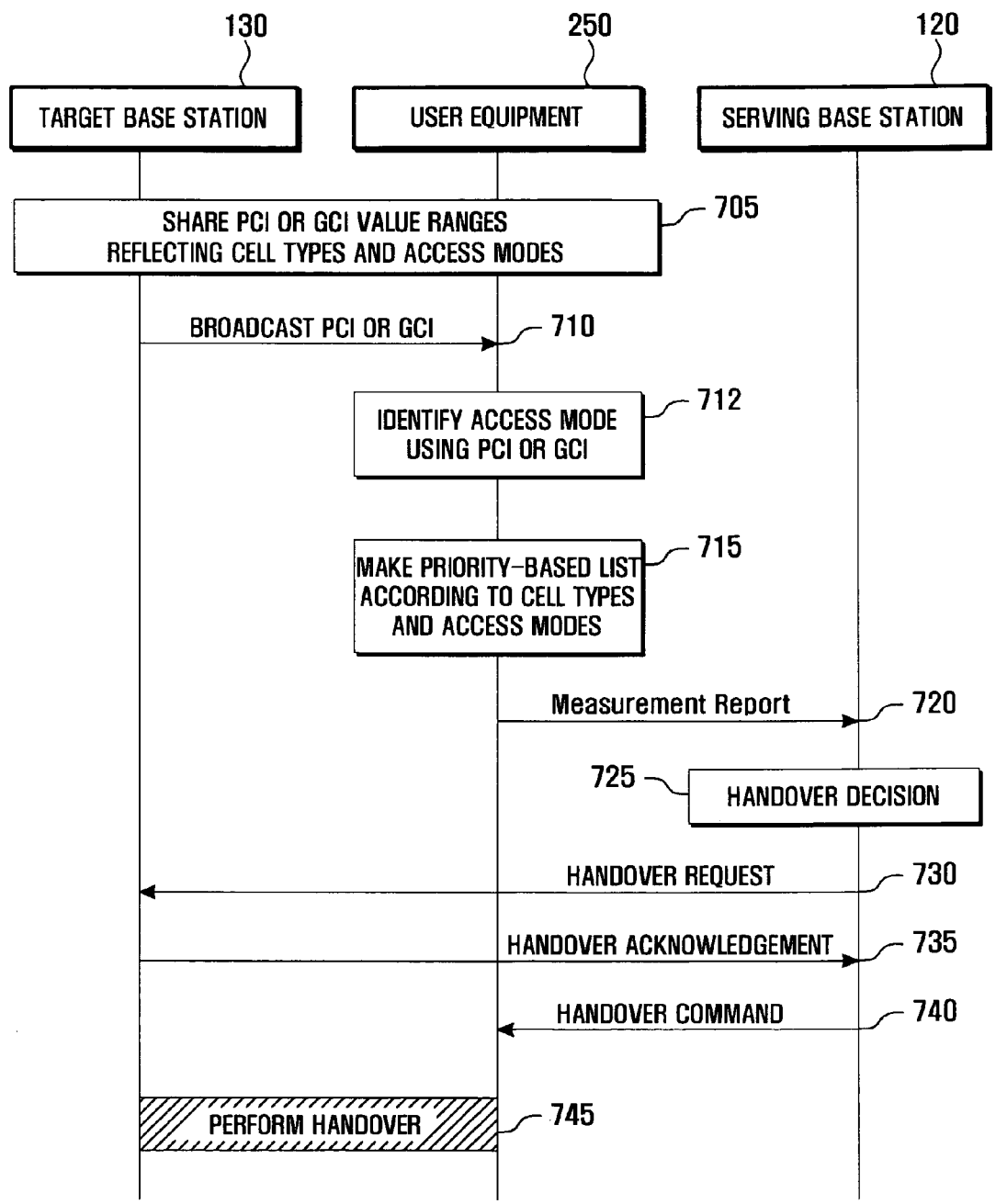
FIG. 7 illustrates a sequence diagram for a handover procedure for a user equipment employing the first embodiment for neighbor cell identification according to another exemplary embodiment of the present invention.
Figure 8:
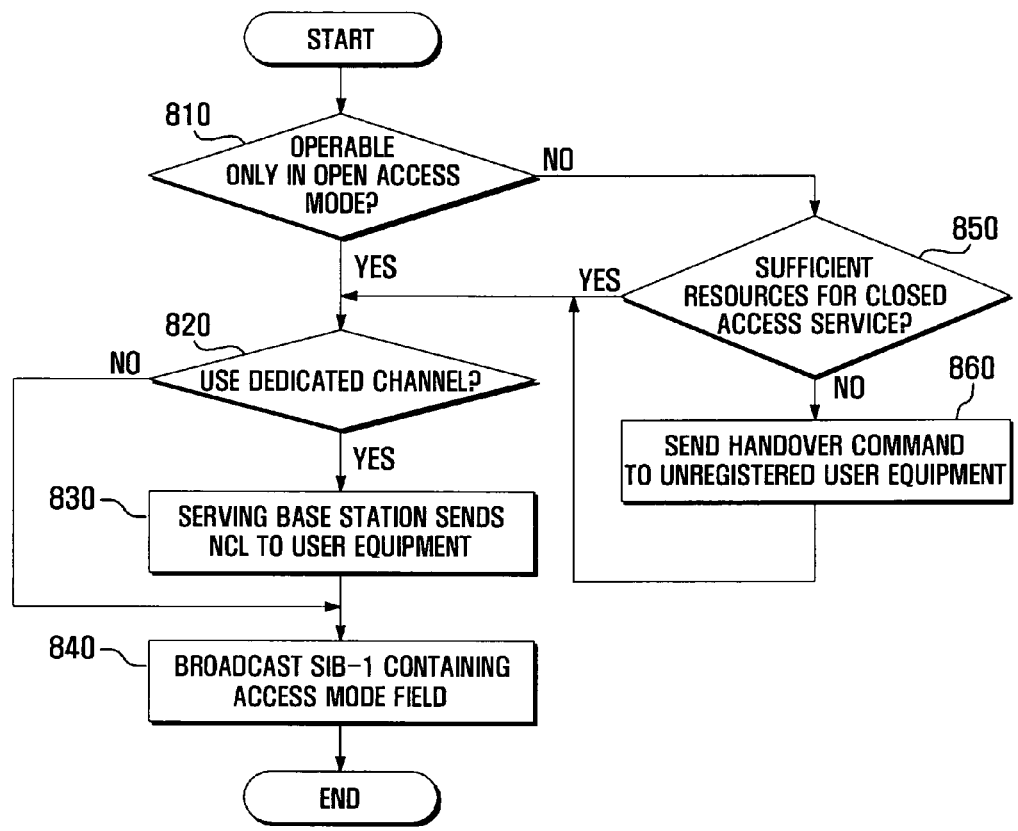
FIG. 8 illustrates an operating procedure for a femtocell employing the second embodiment for neighbor cell identification according to another exemplary embodiment of the present invention.
Figure 9:
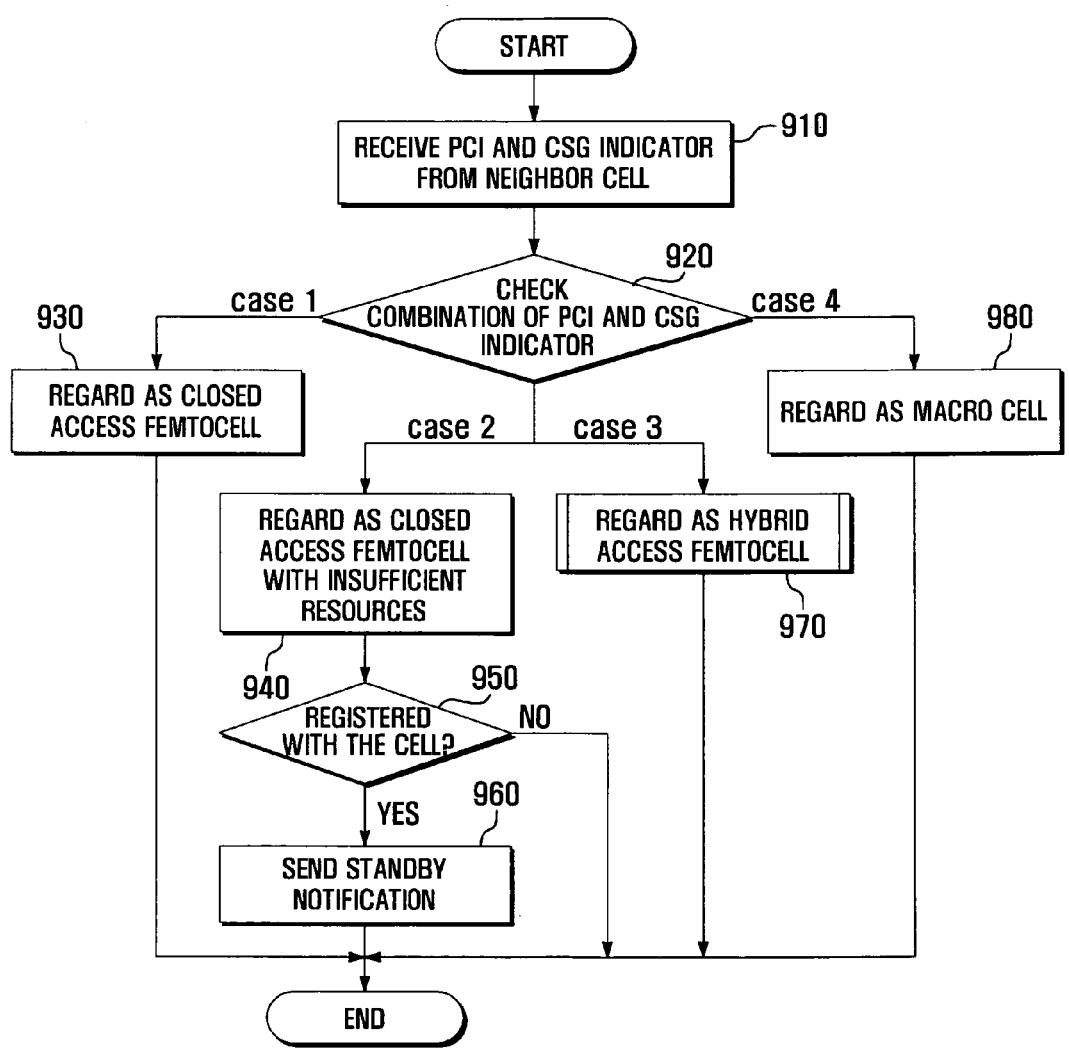
FIG. 9 illustrates a procedure for a user equipment employing the third embodiment for neighbor cell identification according to another exemplary embodiment of the present invention.
Figure 10:
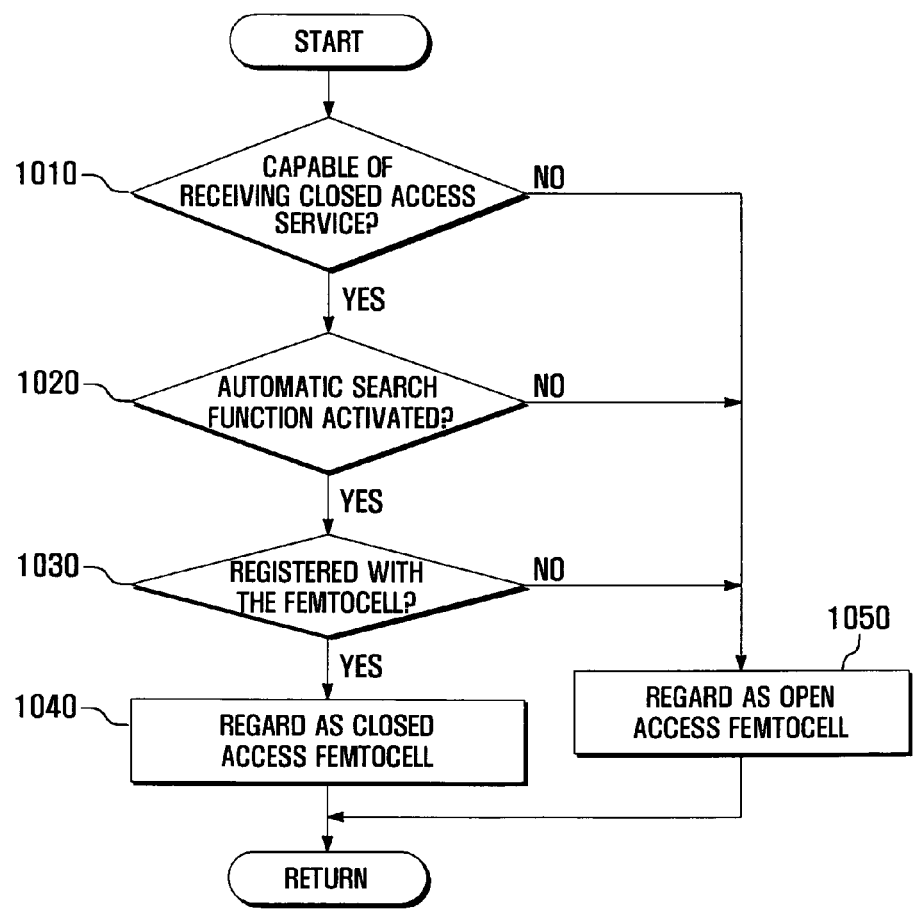
FIG. 10 illustrates a detailed procedure for the user equipment of FIG. 9 to identify a neighbor cell as a femtocell operating in the hybrid access mode.
Figure 11:
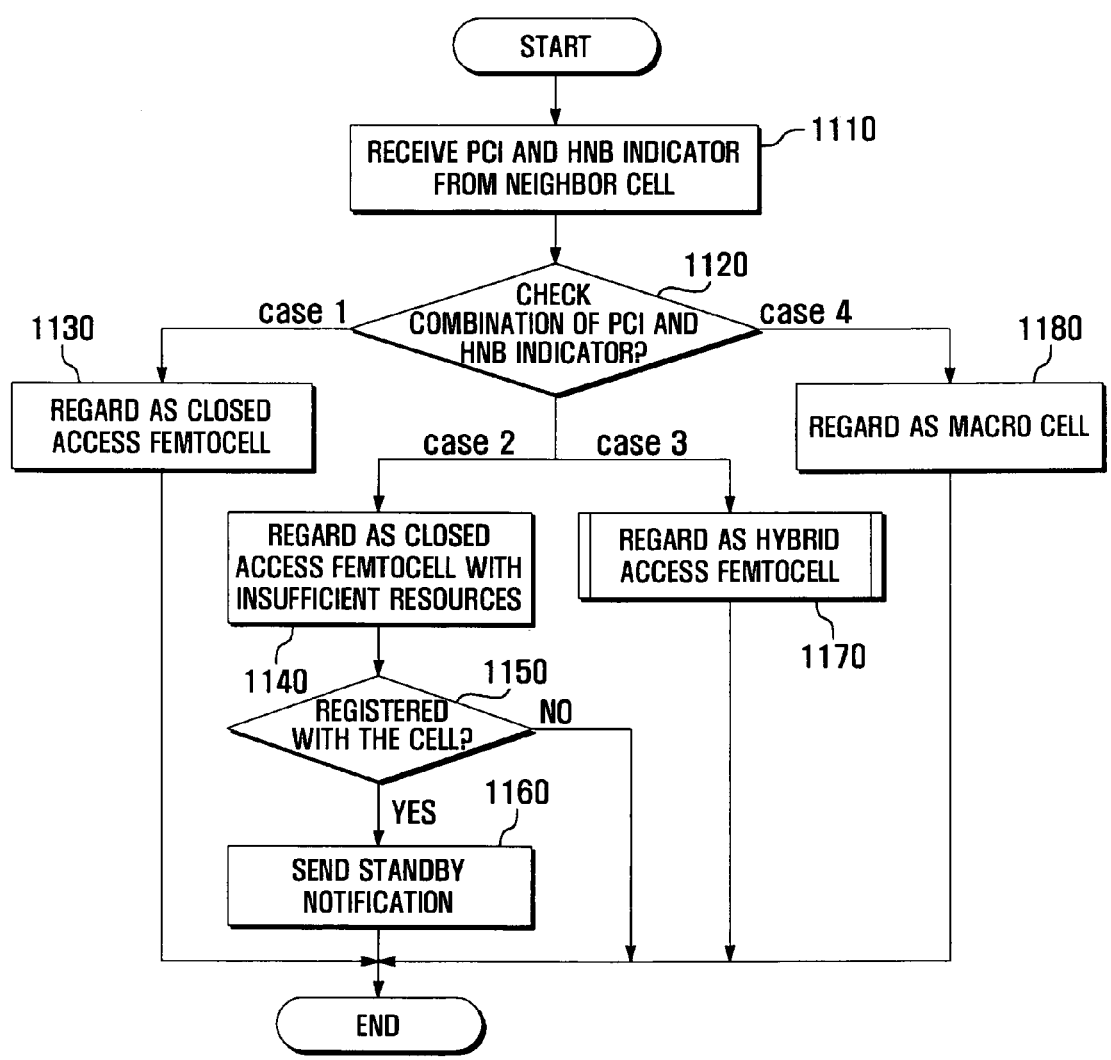
FIG. 11 illustrates a procedure for a user equipment employing the fourth embodiment for neighbor cell identification according to another exemplary embodiment of the present invention.
Figure 12:
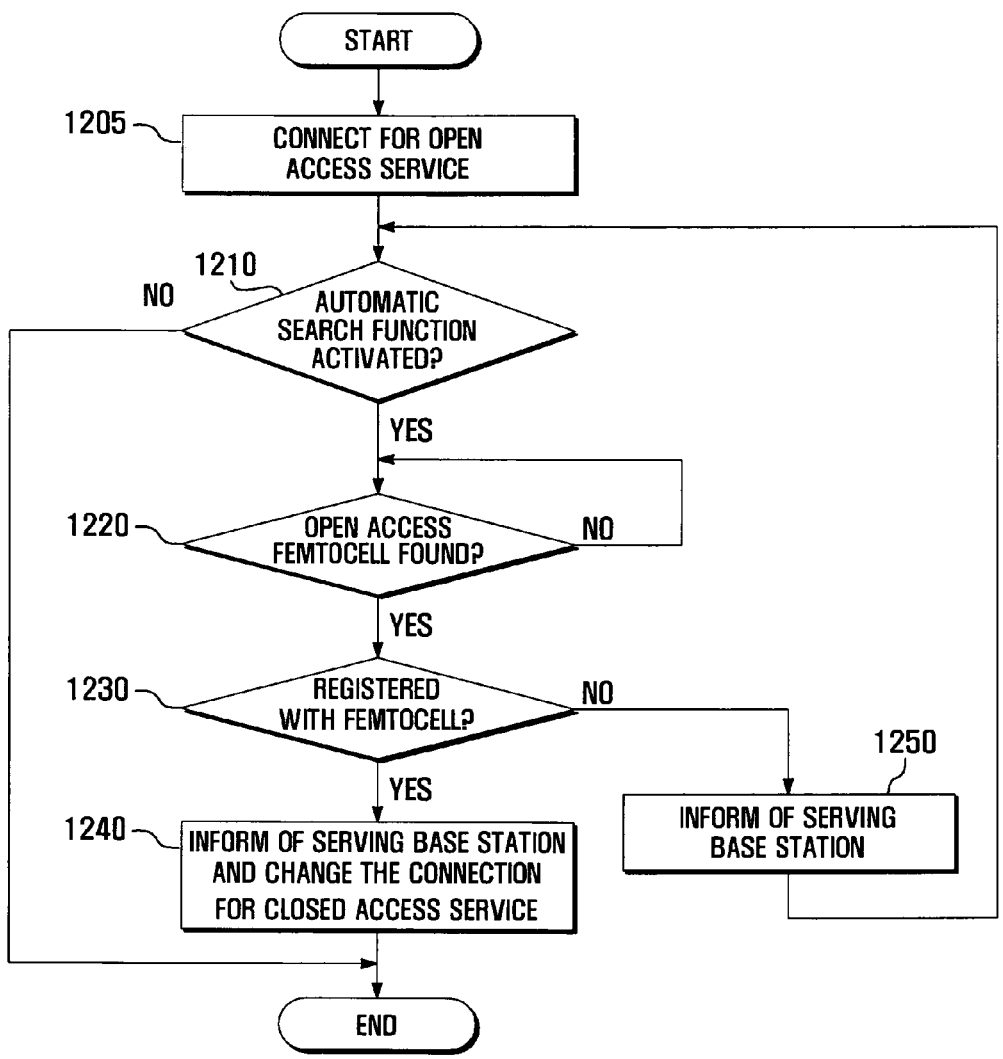
FIG. 12 illustrates a detailed procedure for the user equipment of FIG. 11 to identify a neighbor cell as a femtocell operating in the open access mode.

Here, FIGS. 1 to 6 commonly apply to the four embodiments, FIG. 7 applies to the first embodiment, FIG. 8 applies to the second embodiment, FIGS. 9 and 10 apply to the third embodiment, and FIGS. 11 and 12 apply to the fourth embodiment.

Figure 1:
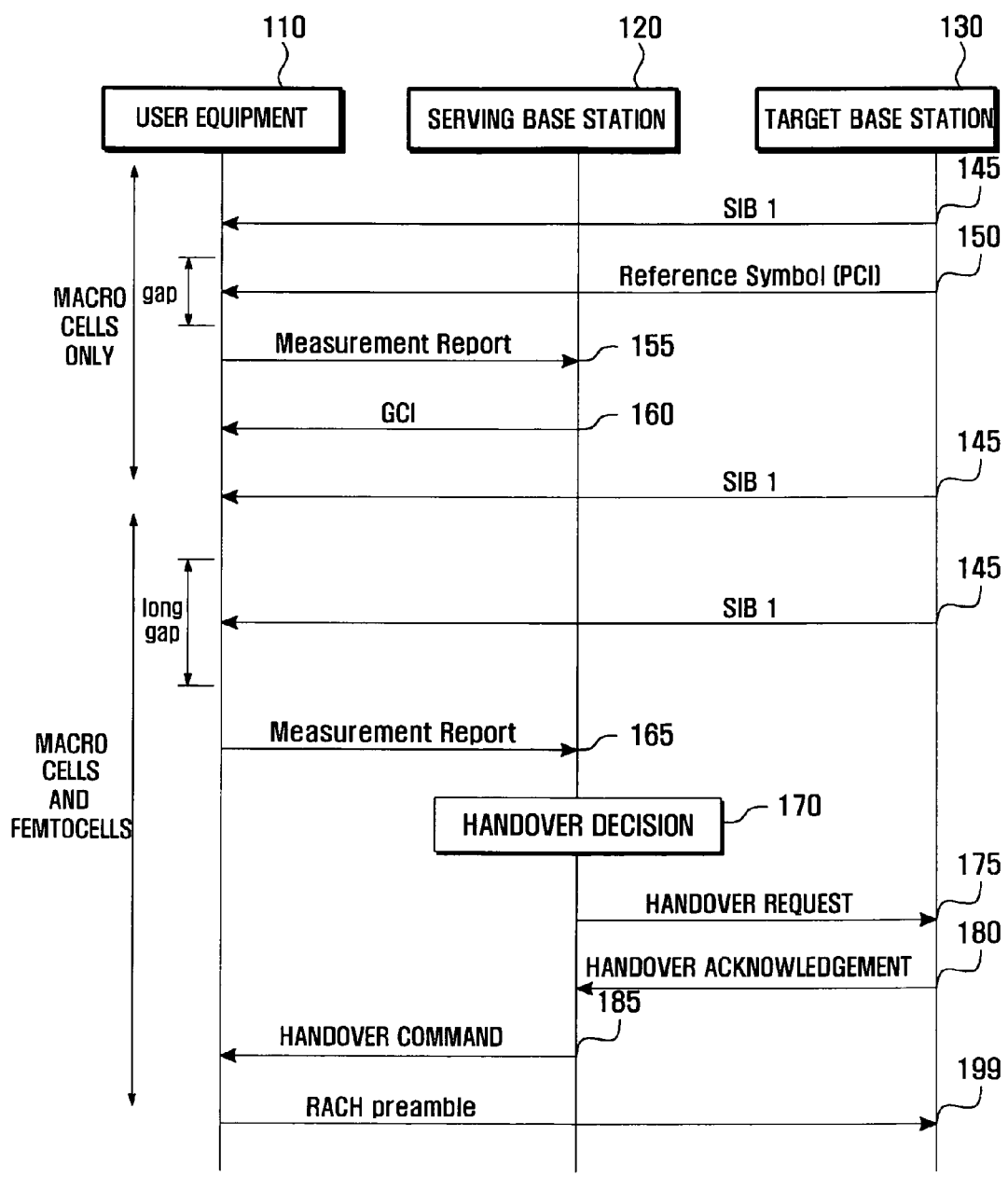
FIG. 1 illustrates a sequence diagram for a procedure for a user equipment to perform neighbor cell search and handover.

FIG. 1 illustrates a typical procedure for a user equipment 110 to perform neighbor cell search and handover. When the user equipment 110 supports access to closed access femtocells, it maintains a whitelist of accessible femtocells. A target base station 130 for handover may be a macro cell base station or a femtocell base station.

Referring to FIG. 1, for handover or cell reselection, the user equipment 110 searches for a neighbor cell. The user equipment 110 receives a reference symbol from a target base station 130, and obtains the PCI 150. One of 504 PCIs is assigned to the target base station 130. However, the assigned PCI is not a unique identity usable for handover. Hence, for handover, the user equipment 110 needs to acquire a GCI, which is regarded as a unique cell identity, of a public land mobile network (PLMN).

In the case where only macro base stations are present in the network, the user equipment 100 sends a measurement report 155 containing the PCI of the target base station 130 to the serving base station 120. Upon reception of the measurement report 155, the serving base station 120 obtains a GCI corresponding to the PCI sent by the user equipment 110 through a pre-stored PCI-GCI mapping table, and sends the obtained GCI 160 to the user equipment 110. Hence, the user equipment 110 can obtain the unique cell identifier of a target base station 130 using only the PCI.

However, in the case where 5000 to 7000 femtocells are deployed in a unit area of 1 $km^2$, it is not possible to obtain a unique cell identifier using only 504 PCIs. This problem also applies to the case where open access or closed access femtocells are present. Hence, the user equipment 110 may have to receive SIB-1 145 directly from the target base station 130 during a measurement gap and check the GCI thereof.

The user equipment 110 receives SIB-1 145 broadcast from the target base station 130. That is, the target base station 130 broadcasts SIB-1 145 at regular intervals. The user equipment 110 receives SIB-1 145 from the target base station 130 during a measurement gap allocated by the serving base station 120.

In SIB-1 145, a Boolean CSG indicator may be contained. When the CSG indicator of received SIB-1 is set to 'true', the user equipment 110 supporting access to closed access femtocells compares the CSG identifier (CSG ID) of the cell broadcasting SIB-1 with the whitelist. If the CSG identity of the cell is in the whitelist (that is, accessible), the user equipment 110 informs the serving base station 120 of this accessibility via measurement report 165. The serving base station 120 makes a handover decision 170 on the basis of the measurement report 165 from the user equipment 110, and performs operations for the handover procedure together with the user equipment 110 (such as handover request 175, handover acknowledgement 180, handover command 185 and RACH preamble 199.

An existing femtocell does not provide information regarding the current access mode (closed access mode, open access mode, or hybrid access mode). Hence, it is necessary to develop a means that enables a user equipment to determine whether a neighbor cell is a macro cell or a femtocell, and to identify the access mode of the found femtocell.

Figure 2:
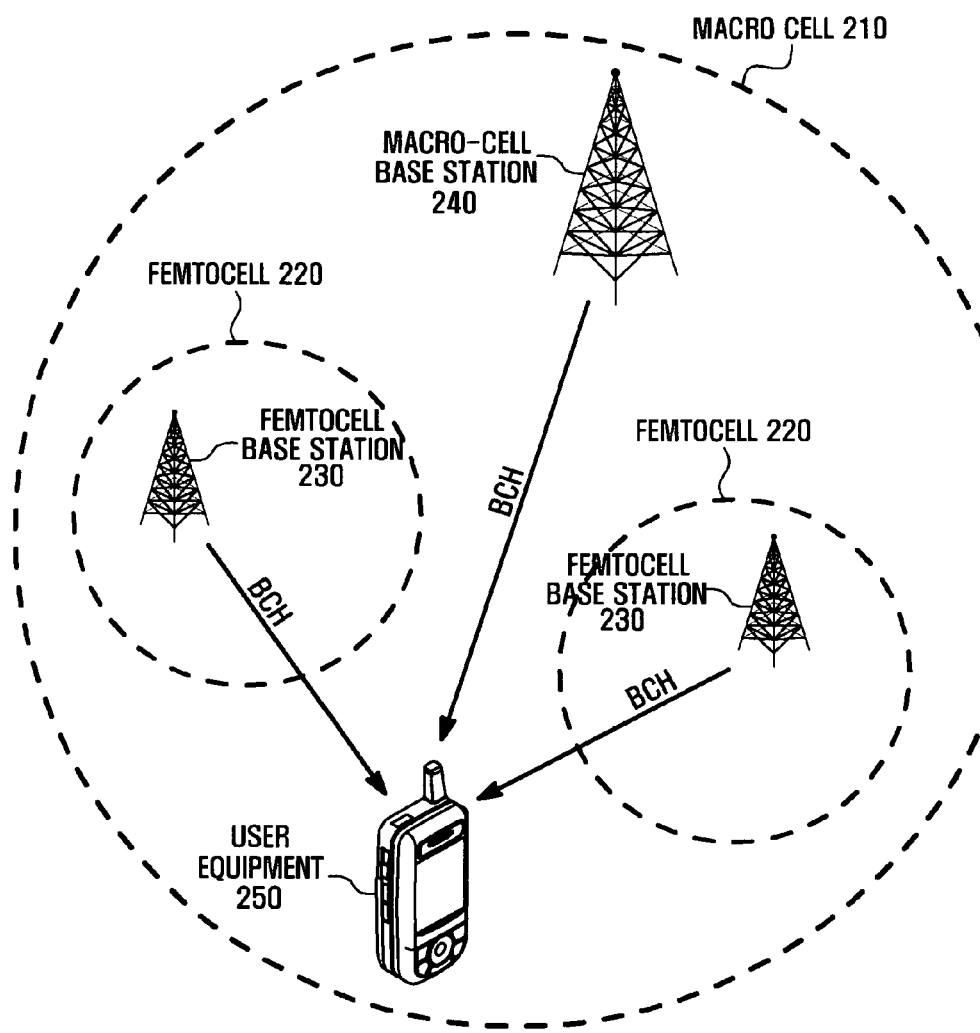
FIG. 2 illustrates a system in which a user equipment identifies the type of a neighbor cell as a macro cell or a femtocell and identifies the access mode of a femtocell according to an exemplary embodiment of the present invention.

FIG. 2 illustrates a system in which a user equipment identifies the type of a neighbor cell as a macro cell or a femtocell and identifies the access mode of a femtocell according to an exemplary embodiment of the present invention. The identification system includes a macro cell 210, femtocell 220, femtocell base station 230, macro-cell base station 240, and user equipment 250.

The macro cell 210 may contain a plurality of femtocells 220. A femtocell 220 is served by a miniaturized indoor base station located in a household or office. Normally, the femtocell 220 is deployed directly by the user at a desired location.

The femtocell base station 230 serves the corresponding femtocell 220. The femtocell base station 230 is an indoor base station that may provide services to members and non-members of the associated CSG. The femtocell base station 230 is connected through a radio network controller (not shown) to the core network (not shown), and provides a mobile communication service to the user equipment 250. In the description, the words "femtocell" and "femtocell base station" may be used interchangeably.

In an embodiment, the femtocell 220 may operate in the open access mode, closed access mode, or hybrid access mode. When operating in the open access mode, the femtocell 220 serves any user equipment in the coverage area regardless of registration. When operating in the closed access mode, the femtocell 220 serves only a registered user equipment.

When operating in the hybrid access mode, the femtocell 220 serves a registered user equipment and an unregistered user equipment. Unlike the open access mode, the femtocell 220 provides a more refined service to a registered user equipment according to the contents of registration.

In an embodiment, the femtocell 220, operating in the hybrid access mode, reserves a portion of resources in order to give a preference for connection to a registered user equipment. That is, the femtocell 220 operating in the hybrid access mode gives access to any user equipment. Later, when resources for open access are exhausted, the femtocell 220 activates the closed access mode to give access only to a registered user equipment.

In another embodiment, the femtocell 220 operating in the hybrid access mode allocates all resources to user equipments. Later, when a registered user equipment approaches, the femtocell 220 reserves a portion of the resources for the registered user equipment by handing over one or more of the connected user equipments to the corresponding macro cell 210. To achieve this, the macro cell 210 maintains a list of user equipments registered with the femtocells 220 within the coverage area. Later, when a user equipment in the list is connected, the macro cell 210 informs the corresponding femtocell 220 of this connection.

The macro-cell base station 240 serves the macro cell 210 to provide mobile communication services to user equipments in the macro cell 210. In the description, the words "macro cell" and "macro-cell base station" may be used interchangeably.

The user equipment 250 establishes a communication link to the macro-cell base station 240 or to the femtocell base station 230 to receive a mobile communication service.

The user equipment 250 receives a neighbor cell identifier broadcast by the macro cell 210 or the femtocell 220. In an embodiment, the neighbor cell identifier may be a PCI, GCI, SIB-1 or a combination thereof. After reception of the neighbor cell identifier, the user equipment 250 identifies the type and access mode of a neighbor cell in several ways.

To be more specific, in the first embodiment for identifying the access mode of a neighbor cell, the user equipment 250 receives a PCI reflecting the type and operating mode from the macro cell 210 or the femtocell 220, as a neighbor cell identifier.

In the second embodiment, each of the macro cell 210 and the femtocell 220 defines an access mode field indicating the type and access mode in SIB-1, and broadcasts the system information according to the current operating mode. The user equipment 250 receives the system information as a neighbor cell identifier from a neighbor cell, and examines the access mode field to identify the type and access mode of the neighbor cell.

In the third embodiment, each of the macro cell 210 and the femtocell 220 broadcasts a PCI and a CSG indicator reflecting the type and access mode as a neighbor cell identifier. The user equipment identifies the type and access mode of a neighbor cell on the basis of the combination of the PCI and CSG indicator.

In the fourth embodiment, each of the macro cell 210 and the femtocell 220 broadcasts a PCI and an HNB indicator reflecting the type and access mode. The user equipment identifies the type and access mode of a neighbor cell on the basis of the combination of the PCI and HNB indicator.

In an embodiment, after identifying the types and access modes of neighbor cells, the user equipment 250 assigns priority values to the identified neighbor cells in order of a closed access femtocell, an open access femtocell and a macro cell, and sends a priority-based list of the neighbor cells to the serving base station. Hence, the user equipment 250 can connect to a neighbor cell with the highest priority according to the priority-based list.

Figure 3:
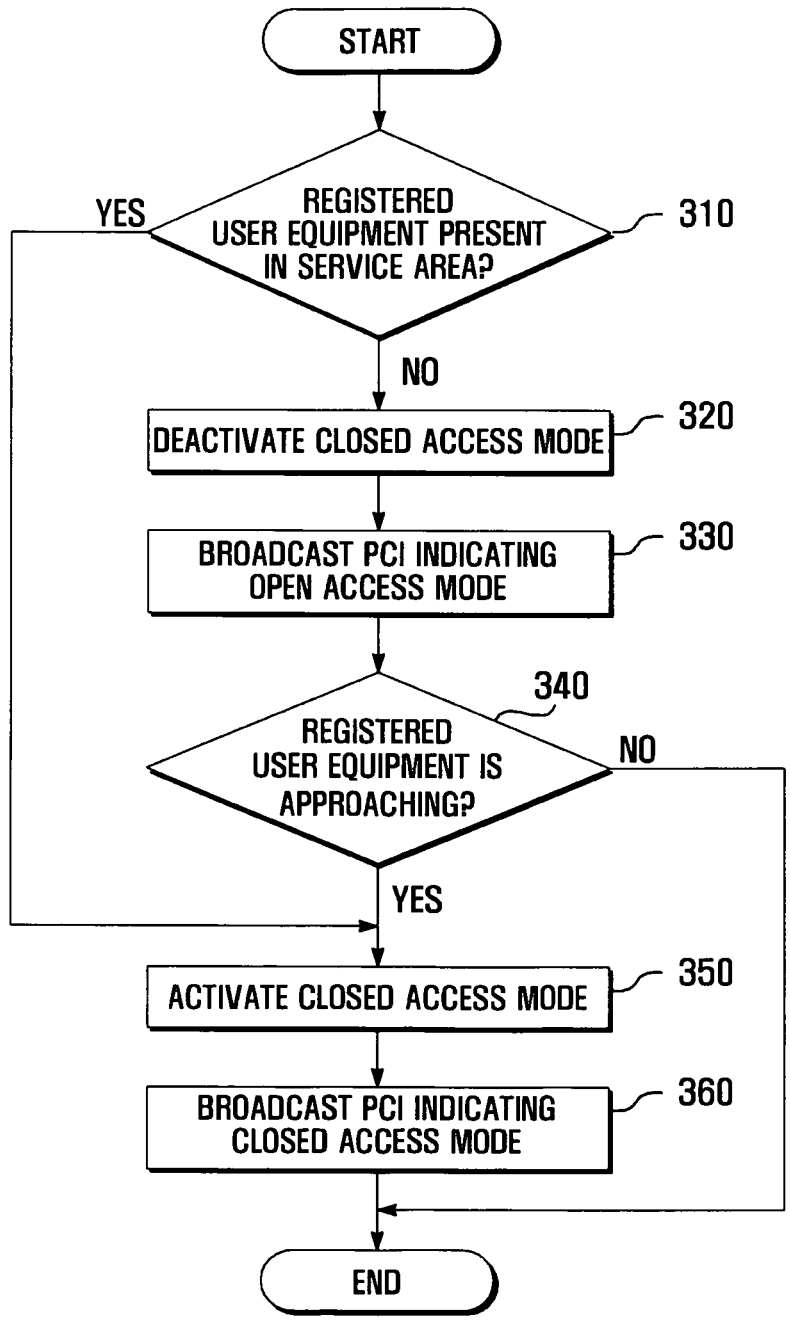
FIG. 3 illustrates a procedure for a femtocell operating in the hybrid access mode to activate the closed access mode or the open access mode according to the presence of a registered user equipment.

FIG. 3 illustrates a procedure for the femtocell 220 operating in the hybrid access mode to activate the closed access mode or the open access mode according to the presence of a registered user equipment 250.

The femtocell 220 operating initially in the hybrid access mode activates the closed access mode or the open access mode depending upon the presence of a registered user equipment 250. In this case, the femtocell 220 owns both a PCI for the open access mode and another PCI for the closed access mode.

Referring to FIG. 3, the femtocell 220 checks whether a registered user equipment 250 is present in the service area (block 310). When a registered user equipment 250 is present in the service area, the femtocell 220 proceeds to block 350.

When a registered user equipment 250 is not present in the service area, the femtocell 220 deactivates the closed access mode and activates the open access mode (block 320). That is, the femtocell 220 operates in the open access mode. The femtocell 220 broadcasts a reference symbol containing a PCI indicating the open access mode (block 330).

The femtocell 220 checks whether a registered user equipment 250 is approaching (block 340). That is, the femtocell 220 sends a list of registered user equipments to a macro cell having an overlapping service area. Later, when a user equipment enters the macro cell and the user equipment is in the list, the macro cell informs the femtocell 220 of the user equipment. Thereby, the femtocell 220 can determine whether a registered user equipment is approaching.

When a registered user equipment 250 approaches, the femtocell 220 activates the closed access mode (block 350). Here, the femtocell 220 may deactivate or sustain the open access mode.

After activating the closed access mode, the femtocell 220 broadcasts a reference symbol containing a PCI indicating the closed access mode (block 360). Thereby, the femtocell 220 gives priority for connection to the registered user equipment.

As described before, when operating in the hybrid access mode, the femtocell 220 owns both a PCI for the open access mode and another PCI for the closed access mode. A user equipment 250 registered with the femtocell 220 is already aware that the femtocell 220 owns the two different PCIs. Thus, even when the broadcast PCI is changed, the femtocell 220 does not have to separately inform the registered user equipment 250 of this change.

Figure 4:
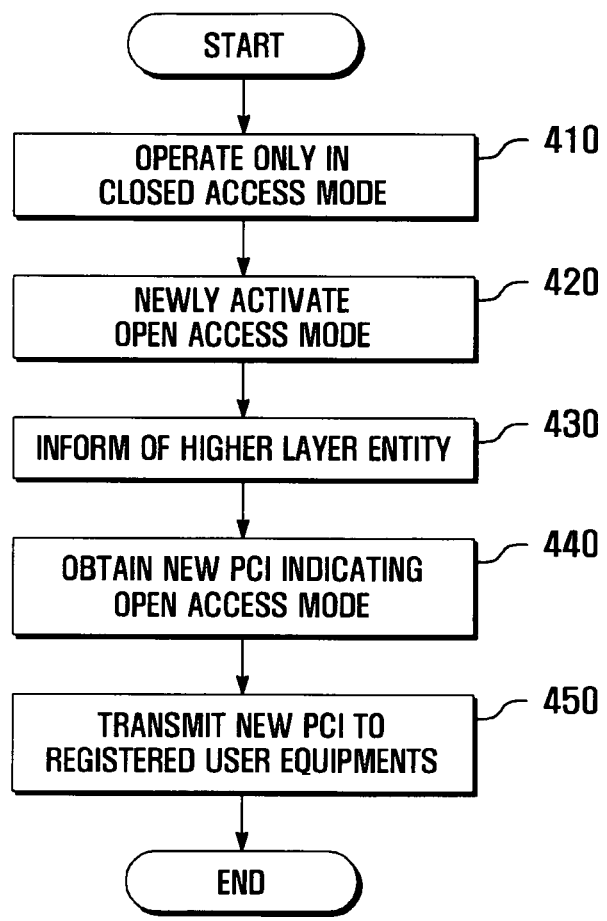
FIG. 4 illustrates a procedure for a femtocell operating in the closed access mode to newly activate the open access mode.

FIG. 4 illustrates a procedure for a femtocell 220 operating in the closed access mode to newly activate the open access mode.

Referring to FIG. 4, the femtocell 220 operates initially only in the closed access mode (block 410). In this case, the femtocell 220 owns and broadcasts a PCI for the closed access mode.

Thanks to sufficiency of radio resources or the like, the femtocell 220 activates the open access mode (block 420). In the open access mode, it is necessary for the femtocell 220 to broadcast a PCI for the open access mode. However, the femtocell 220 may not own a PCI for the open access mode because it started to operate only in the closed access mode.

The femtocell 220 informs a higher layer entity such as the mobility management entity (MME) of the operating mode change toward the open access mode (block 430). The femtocell 220 receives a new PCI for the open access mode assigned by the higher layer entity (block 440).

At block 420, the femtocell 220 may activate the open access mode in response to a request for load balancing from the network. In this case, it is also necessary for the femtocell 220 to receive a new PCI for the open access mode assigned by the higher layer entity (such as MME).

Unlike the case of FIG. 3, it is necessary for the femtocell 220 to inform registered user equipments of the change of the operating mode to the open access mode. That is, the femtocell 220 transmits the newly assigned PCI to the registered user equipments (block 450). The user equipment 250 receives the new PCI, and may perform automatic cell search utilizing both the old PCI for the closed access mode and the new PCI for the open access mode.

FIG. 5 illustrates a control procedure for a user equipment 250 to access a femtocell.

Referring to FIG. 5, the user equipment 250 determines whether handover (or cell reselection) is necessary (block 510). If handover is necessary, the user equipment 250 performs neighbor cell search (block 520).

The user equipment 250 determines whether the found cell is a femtocell operating in the hybrid access mode (block 530). If the found cell is not a femtocell operating in the hybrid access mode, the user equipment 250 performs a regular handover procedure (block 540).

If the found cell is a femtocell operating in the hybrid access mode, the user equipment 250 checks whether it is capable of receiving a closed access service (block 545). If incapable of receiving a closed access service, the user equipment 250 performs a regular handover procedure (block 540).

If capable of receiving a closed access service, the user equipment 250 checks whether it is a user equipment registered with the found femtocell (block 550). If a registered user equipment, the user equipment 250 requests the femtocell to offer a closed access service and performs handover to the femtocell operating in the closed access mode (block 560).

If not a registered user equipment, the user equipment 250 requests the femtocell to offer an open access service and performs handover to the femtocell operating in the open access mode (block 570).

FIG. 6 illustrates a procedure for a user equipment executing an automatic search function to search for a femtocell with which the user equipment is registered.

The automatic search function refers to a function that enables a user equipment capable of receiving a closed access service to continue neighbor cell search until the user equipment is connected to a femtocell with which the user equipment is registered. When an open access femtocell is found through neighbor cell search after the automatic search function is activated, the user equipment 250 connects to the found open access femtocell first, and continues to perform neighbor cell search until a femtocell with which the user equipment 250 is registered is found.

Referring to FIG. 6, the user equipment 250 capable of receiving a closed access service activates the automatic search function (block 605). When handover (or cell reselection) is necessary, the user equipment 250 performs neighbor cell search (block 610).

The user equipment 250 checks whether the signal strength of a found neighbor cell is greater than or equal to a preset threshold (block 615). If the signal strength of the neighbor cell is greater than or equal to the preset threshold, the user equipment 250 receives SIB-1 broadcast by the neighbor cell (block 620). The user equipment 250 checks whether the CSG indicator in SIB-1 is set to '1' (block 625). Here, the CSG indicator set to '1' indicates that the cell operates in the closed access mode.

If the CSG indicator in SIB-1 is not set to '1', the user equipment 250 checks whether the automatic search function is still activated (block 630). If the automatic search function is still activated, the user equipment 250 determines whether a femtocell with which the user equipment 250 is registered is not present at the current location (block 631). If a femtocell with which the user equipment 250 is registered is not present at the current location, the user equipment 250 deactivates the automatic search function (block 632). If a femtocell with which the user equipment 250 is registered is present at the current location, the user equipment 250 returns to block 610 for neighbor cell search.

If the CSG indicator in SIB-1 is set to '1', the user equipment 250 checks the possibility of receiving a closed access service from the found neighbor cell (block 635). That is, the user equipment 250 checks whether it has registered with the found neighbor cell. If registered with the neighbor cell, the user equipment 250 performs handover to the neighbor cell operating in the closed access mode (block 640).

If not registered with the neighbor cell, the user equipment 250 checks whether the PCI received from the neighbor cell is a PCI for the open access mode (block 645). That is, the user equipment 250 checks whether the neighbor cell supports both the closed access mode and the open access mode.

If the received PCI is a PCI for the open access mode, the user equipment 250 performs handover to the neighbor cell operating in the open access mode (block 650). If the received PCI is not a PCI for the open access mode, the user equipment 250 checks whether the automatic search function is still activated (block 665). If the automatic search function is still activated, the user equipment 250 returns to block 610 for neighbor cell search. If the automatic search function is not activated, the user equipment 250 finishes the process. When the user equipment 250 travels and enters a region where a femtocell with which the user equipment 250 is registered is not present, the automatic search function is deactivated.

First Embodiment For Neighbor Cell Identification

Next, a description is given of the first embodiment for identifying the type and access mode of a neighbor cell, where the user equipment 250 utilizes a PCI reflecting the type and access mode as a neighbor cell identifier.

In the first embodiment, the PCI is designed to reflect the type and access mode of the corresponding cell. PCI value ranges may be arranged in a manner shown in Table 1. The PCI value ranges may be arranged in other ways. GCI value ranges may be arranged in a similar manner.

TABLE 1

| PCI value range | Cell type and access mode |
| --- | --- |
| 0-a | Macro cell |
| a + 1-b | Closed access mode |
| b + 1-c | Hybrid access mode |
| c + 1-503 | Open access mode |

In Table 1, values a, b and c are integers greater than zero. The user equipment 250, macro cell 210 and femtocells 220 share information on the PCI value ranges. Values a, b and c may be dynamically adjusted according to the number of corresponding base stations.

FIG. 7 illustrates a handover procedure for a user equipment 250 employing the first embodiment for neighbor cell identification according to another exemplary embodiment of the present invention. The user equipment 250 receives a PCI from a target base station 130 and reports the received PCI to the serving base station 120. The target base station 130 corresponds to a neighbor cell to which the user equipment 250 attempts to hand over, and may correspond to the macro cell 210 or a femtocell 220.

Referring to FIG. 7, the target base station 130 and user equipment 250 share information regarding PCI or GCI value ranges reflecting the cell types and access modes (block 705).

The target base station 130 broadcasts its PCI 710. The user equipment 250 near the target base station 130 receives the broadcast PCI. Although FIG. 7 depicts that the user equipment 250 receives a PCI from a single base station, the user equipment 250 receives PCIs from all nearby base stations.

The user equipment 250 identifies the type and access mode of the target base station 130 on the basis of the value range of the received PCI (block 712). The user equipment 250 makes a priority-based list of neighbor base stations according to their types and access modes (block 715). Making a priority-based list of neighbor base stations (or neighbor cells) according to their types and access modes commonly applies to the four embodiments of the present invention.

The user equipment 250 assigns priority values to neighbor cells of the priority-based list in order of a closed access femtocell, an open access femtocell and a macro cell. The user equipment 250 transmits a measurement report 720 containing the priority-based list to the serving base station 120.

The serving base station 120 makes a handover decision 725 for the user equipment 250. Thereafter, a handover procedure is performed through handover request 730, handover acknowledgement 735, handover command 740 and handover 745. The handover procedure is well known to a person in the art, and a detailed description thereof is omitted.

In an embodiment, a femtocell operating in the hybrid access mode may give access to any user equipment regardless of registration, and may provide a closed access service to a registered user equipment.

Second Embodiment For Neighbor Cell Identification

Next, a description is given of the second embodiment for identifying the type and access mode of a neighbor cell, where the user equipment 250 utilizes a piece of system information as a neighbor cell identifier.

In the second embodiment, each of the macro cell 210 and the femtocell 220 broadcasts system information containing an access mode field at Cell Access Related Information. In an embodiment, the system information may be SIB-1 (system information block 1) or MIB (master information block). A neighbor cell may broadcast an SIB-1 or MIB containing the access mode field if necessary. In addition to SIB-1 and MIB, the access mode field may be defined in any other system information block that can be broadcast.

Table 2 illustrates an example of an access mode field defined at Cell Access Related Information in SIB-1. The access mode field may also be defined in MIB in a similar way.

TABLE 2

```
SystemInformationBlockType1 ::= SEQUENCE {
cellAccessRelatedInformation SEQUENCE {
plmn-IdentityList PLMN-IdentityList,
trackingAreaCode TrackingAreaCode,
cellIdentity CellIdentity,
cellBarred ENUMERATED {barred, notBarred},
intraFrequencyCellReselection BOOLEAN OPTIONAL, -- Cond
CellBarred
cellReservationExtension ENUMERATED {reserved,
notReserved},
csg-Indication BOOLEAN
access mode ENUMERATED {access mode1, access mode2, access
mode3, access mode4} / added access mode field /
}...
}
```

In an embodiment, "access mode1", "access mode2", "access mode3", and "access mode4" shown in Table 2 may be matched respectively with "macro cell", "open access mode", "closed access mode", and "hybrid access mode".

FIG. 8 illustrates an operating procedure for a femtocell 220 employing the second embodiment for neighbor cell identification according to another exemplary embodiment of the present invention.

Referring to FIG. 8, the femtocell 220 determines whether it is operable only in the open access mode (block 810). If operable only in the open access mode, the femtocell 220 determines whether it uses a dedicated channel (block 820). The use of a dedicated channel indicates that the femtocell 220 utilizes a frequency band different from that used by the macro cell 210.

If the femtocell 220 uses a dedicated channel, the serving base station 120 sends a neighbor cell list (NCL) to the user equipment 250 (block 830). Thereafter, the femtocell 220 broadcasts system information containing the access mode field (block 840). Upon reception of the system information, the user equipment 250 can identify the access mode of the cell broadcasting the system information. As described above, the system information may be SIB-1 or MIB.

The operability of the femtocell 220 may be found not to be limited to the open access mode at block 810. That is, the femtocell 220 is also operable in the closed access mode.

If operable in the closed access mode, the femtocell 220 determines whether sufficient resources are available for providing a closed access service (block 850). If sufficient resources are available, the femtocell 220 returns to block 820. If sufficient resources are not available, the femtocell 220 sends a command for handover toward another cell to one or more unregistered user equipments.

The above-described steps except for block 840 may be applied to all the four embodiments of the present invention.

Third Embodiment For Neighbor Cell Identification

Next, a description is given of the third embodiment for identifying the type and access mode of a neighbor cell, where the user equipment 250 utilizes the PCI and CSG indicator of SIB-1 as a neighbor cell identifier.

In the third embodiment, the type and access mode of a cell is determined on the basis of a combination of the PCI value range and CSG indicator. Table 3 illustrates combinations of the PCI value range and CSG indicator for identification of the cell type and access mode. Table 3 is only for illustrative purposes, and the present invention is not necessarily limited to the contents of Table 3.

TABLE 3

| Case | PCI value range | CSG indicator | Access mode |
|---|---|---|---|
| 1 | Closed access mode | 1 | Closed access mode |
| 2 | Closed access mode | 0 | Closed access mode (overloaded) |
| 3 | Open access mode | 1 | Hybrid access mode |
| 4 | Open access mode | 0 | Macro cell |

In Table 3, case 1, where the PCI is within the value range for the closed access mode and the CSG indicator in SIB-1 is set to 'true' (or '1'), indicates that the corresponding cell is a femtocell operating in the closed access mode. Case 2, where the PCI is within the value range for the closed access mode and the CSG indicator in SIB-1 is set to 'false' (or '0'), indicates that the corresponding cell is an overloaded femtocell operating in the closed access mode. Case 3, where the PCI is within the value range for the open access mode and the CSG indicator in SIB-1 is set to 'true' (or '1'), indicates that the corresponding cell is a femtocell operating in the hybrid access mode. Case 4, where the PCI is within the value range for the open access mode and the CSG indicator in SIB-1 is set to 'false' (or '0'), indicates that the corresponding cell is a macro cell.

FIG. 9 illustrates a procedure for a user equipment 250 employing the third embodiment for neighbor cell identification according to another exemplary embodiment of the present invention. The user equipment 250 receives a PCI and SIB-1 from a neighbor cell.

Referring to FIG. 9, the user equipment 250 receives a PCI and SIB-1 containing a CSG indicator as a neighbor cell identifier from a neighbor cell (block 910). The user equipment 250 checks the combination of the PCI and CSG indicator to identify the type and access mode of the neighbor cell (block 920). The combinations of the PCI and CSG indicator are described in connection with Table 3, and a description thereof is omitted.

If the combination corresponds to case 1, the user equipment 250 regards the neighbor cell as a femtocell operating in the closed access mode (block 930).

If the combination corresponds to case 2, the user equipment 250 regards the neighbor cell as an overloaded femtocell operating in the closed access mode (block 940). The user equipment 250 determines whether it has registered with the neighbor cell (block 950). When registered with the neighbor cell, the user equipment 250 sends a standby notification to the neighbor cell (block 960). After the neighbor cell releases a connection to one or more user equipments in response to the standby notification, the user equipment 250 may preferentially connect to the neighbor cell.

If the combination corresponds to case 3, the user equipment 250 regards the neighbor cell as a femtocell operating in the hybrid access mode (block 970). Block 970 is described further in connection with FIG. 10.

If the combination corresponds to case 4, the user equipment 250 regards the neighbor cell as a macro cell (block 980).

FIG. 10 illustrates a detailed procedure for the user equipment 250 of FIG. 9 to identify a neighbor cell as a femtocell operating in the hybrid access mode.

Referring to FIG. 10, when identifying a neighbor cell as a femtocell operating in the hybrid access mode, the user equipment 250 may have to determine the type of service to receive from the neighbor cell. Hence, the user equipment 250 determines whether it is capable of receiving a closed access service (block 1010). If incapable of receiving a closed access service, the user equipment 250 regards the neighbor cell as a femtocell operating in the open access mode (block 1050), and may perform a corresponding handover procedure.

If capable of receiving a closed access service, the user equipment 250 checks whether the automatic search function is activated (block 1020). If the automatic search function is not activated, the user equipment 250 regards the neighbor cell as a femtocell operating in the open access mode (block 1050), and may perform a corresponding handover procedure.

If the automatic search function is activated, the user equipment 250 determines whether it has registered with the neighbor cell (block 1030). If not having registered with the neighbor cell, the user equipment 250 regards the neighbor cell as a femtocell operating in the open access mode (block 1050), and may perform a corresponding handover procedure. If having registered with the neighbor cell, the user equipment 250 regards the neighbor cell as a femtocell operating in the closed access mode (block 1040), and may perform a corresponding handover procedure.

Fourth Embodiment For Neighbor Cell Identification

Next, a description is given of the fourth embodiment for identifying the type and access mode of a neighbor cell, where the user equipment 250 utilizes the PCI and HNB indicator as a neighbor cell identifier. The HNB indicator may be newly defined as a Boolean value at SIB-1, or the CSG indicator may be used as the HNB indicator. The HNB indicator may be defined by the use of a field indicating whether the corresponding cell is a femtocell.

In the fourth embodiment, the type and access mode of a cell is determined on the basis of a combination of the PCI value range and HNB indicator. Table 4 illustrates combinations of the PCI value range and HNB indicator for identification of the cell type and access mode. Table 4 is only for illustrative purposes, and the present invention is not necessarily limited to the contents of Table 4.

TABLE 4

| Case | PCI value range | HNB indicator | Access mode |
| --- | --- | --- | --- |
| 1 | Closed access mode | 1 | Closed access mode |
| 2 | Closed access mode | 0 | Closed access mode (overloaded) |
| 3 | Open access mode | 1 | Open access mode |
| 4 | Open access mode | 0 | Macro cell |

In Table 4, case 1, where the PCI is within the value range for the closed access mode and the HNB indicator is set to 'true' (or '1'), indicates that the corresponding cell is a femtocell operating in the closed access mode. Case 2, where the PCI is within the value range for the closed access mode and the HNB indicator is set to 'false' (or '0'), indicates that the corresponding cell is an overloaded femtocell operating in the closed access mode. Case 3, where the PCI is within the value range for the open access mode and the HNB indicator is set to 'true' (or '1'), indicates that the corresponding cell is a femtocell operating in the open access mode. Case 4, where the PCI is within the value range for the open access mode and the HNB indicator is set to 'false' (or '0'), indicates that the corresponding cell is a macro cell.

As can be seen from Table 4, a user equipment 250 cannot determine whether a found cell is a femtocell operating in the hybrid access mode. This is because the HNB indicator indicates whether the cell is a femtocell but does not indicate the access mode of the cell.

In the fourth embodiment, a hybrid access femtocell broadcasts information indicating the open access mode (case 3) as a neighbor cell identifier. This femtocell operates in the open access mode, and gives access to unregistered user equipments. Later, when a registered user equipment is present, the femtocell provides a closed access service to the registered user equipment.

FIG. 11 illustrates a procedure for a user equipment 250 employing the fourth embodiment for neighbor cell identification according to another exemplary embodiment of the present invention. The user equipment 250 receives a PCI and HNB indicator from a neighbor cell.

Referring to FIG. 11, the user equipment 250 receives a PCI and HNB indicator as a neighbor cell identifier from a neighbor cell (block 1110). The user equipment 250 checks the combination of the PCI and HNB indicator to identify the type and access mode of the neighbor cell (block 1120). The combinations of the PCI and HNB indicator are described in connection with Table 4, and a description thereof is omitted.

If the combination corresponds to case 1, the user equipment 250 regards the neighbor cell as a femtocell operating in the closed access mode (block 1130).

If the combination corresponds to case 2, the user equipment 250 regards the neighbor cell as an overloaded femtocell operating in the closed access mode (block 1140). The user equipment 250 determines whether it has registered with the neighbor cell (block 1150). When having registered with the neighbor cell, the user equipment 250 sends a standby notification to the neighbor cell (block 1160). After the neighbor cell releases a connection to one or more user equipments in response to the standby notification, the user equipment 250 may preferentially connect to the neighbor cell.

If the combination corresponds to case 3, the user equipment 250 regards the neighbor cell as a femtocell operating in the hybrid access mode (block 1170). Block 1170 is described further in connection with FIG. 12.

If the combination corresponds to case 4, the user equipment 250 regards the neighbor cell as a macro cell (block 1180).

FIG. 12 illustrates a detailed procedure for the user equipment 250 of FIG. 11 to identify a neighbor cell as a femtocell operating in the open access mode.

In the fourth embodiment, the user equipment 250 cannot readily determine whether a neighbor cell is a femtocell operating in the hybrid access mode. In this case, the user equipment 250 connects to a femtocell operating in the open access mode, and checks whether it has registered with the femtocell.

Referring to FIG. 12, the user equipment 250 connects to the neighbor cell for an open access service (block 1205). The user equipment 250 checks whether the automatic search function is activated (block 1210). If the automatic search function is activated, the user equipment 250 checks whether an open access femtocell is found (block 1220). In this case, the user equipment 250 has already found an open access femtocell and connected to it. The user equipment 250 checks whether it has registered with the connected femtocell (block 1230).

If having registered with the femtocell, the user equipment 250 informs the serving base station of registration and changes the connection for a closed access service (block 1240). If having registered with the femtocell, the user equipment 250 informs the serving base station of non-registration, sustains the connection for an open access service (block 1250), and returns to step 1210 for continued femtocell search while the automatic search function is activated.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting a neighbor cell identification of a neighbor cell in a mobile communication system, the method comprising:
    transmitting a neighbor cell identifier comprising information regarding a type of the neighbor cell to a user equipment (UE); and
    performing access control for the UE based on an identification result of the UE for the neighbor cell, the neighbor cell comprising one of a macro cell and a femtocell, the femtocell configured to selectively operate in a plurality of access modes, the plurality of access modes comprising a closed access mode in which the femtocell serves only registered UEs, an open access mode in which the femtocell serves both registered UEs and non-registered UEs, and a hybrid access mode in which the femtocell can be operated in either of the closed access mode and open access mode,
    wherein transmitting the neighbor cell identifier comprises:
        determining, when the femtocell operates in the hybrid access mode, whether a registered user equipment is present in a service area;

transmitting, when a registered user equipment is not present in the service area, by the femtocell, a neighbor cell identifier indicating the open access mode; and activating, when a registered user equipment is present in the service area, by the femtocell, the closed access mode and transmitting a neighbor cell identifier indicating the closed access mode.

2. The neighbor cell identification method of claim 1, wherein transmitting a neighbor cell identifier further comprises transmitting, by the neighbor cell, a Physical Cell Identity (PCI) classified by the type of the neighbor cell.

3. The neighbor cell identification method of claim 1, wherein in transmitting the neighbor cell identifier, the neighbor cell is configured to transmit a PCI or a Global Cell Identifier (GCI) whose value range reflects the cell type and access mode.

4. The neighbor cell identification method of claim 1, wherein in transmitting the neighbor cell identifier, the neighbor cell is configured to transmit system information containing information regarding the cell type and access mode.

5. The neighbor cell identification method of claim 4, wherein the system information is one of a system information block 1 and a master information block.

6. The neighbor cell identification method of claim 1, wherein in transmitting the neighbor cell identifier, the neighbor cell is configured to transmit, as the neighbor cell identifier, a combination of a PCI and Closed Subscriber Group (CSG) indicator reflecting the cell type and access mode.

7. The neighbor cell identification method of claim 1, wherein in transmitting the neighbor cell identifier, the neighbor cell is configured to transmit, as the neighbor cell identifier, a combination of a PCI and Home eNodeB (HNB) indicator reflecting the cell type and access mode.

8. The neighbor cell identification method of claim 1, wherein when the user equipment is able to access the neighbor cell, the information is further configured to enable the user equipment to connect preferentially to a closed access femtocell with which the user equipment has registered.

9. The neighbor cell identification method of claim 1, wherein the information further is configured to enable the user equipment to access the neighbor cell, the accessing comprising:
determining, when the user equipment is connected to an open access femtocell, whether an automatic search function is activated; and
searching for, when the automatic search function is activated, a closed access femtocell for connection.

10. The neighbor cell identification method of claim 1, wherein transmitting the neighbor cell identifier further comprises obtaining, when the femtocell newly activates the open access mode, a PCI indicating the open access mode from a higher layer entity.

11. A user equipment capable of neighbor cell identification in a mobile communication system, the user equipment configured to:
receive a neighbor cell identifier from a neighbor cell;
identify a type of the neighbor cell; and
access the neighbor cell according to the identification result, the neighbor cell comprising one of a macro cell and a femtocell, the femtocell configured to selectively operate in a plurality of access modes, the plurality of access modes comprising a closed access mode in which the femtocell serves only registered user equipments, an open access mode in which the femtocell serves both registered user equipments and non-registered user equipments, and a hybrid access mode in which the femtocell can be operated in either of the closed access mode and open access mode, wherein receiving the neighbor cell identifier comprises receiving, when the user equipment is not present in a service area, from the femtocell, a neighbor cell identifier indicating the open access mode, wherein when the user equipment is present in the service area, the femtocell activates the closed access mode and transmits a neighbor cell identifier indicating the closed access mode.

12. The user equipment of claim 11, wherein the neighbor cell identifier is a Physical Cell Identity (PCI) classified by the type of the neighbor cell.

13. The user equipment of claim 11, wherein the neighbor cell identifier is transmitted through system information containing information regarding the cell type and access mode of the neighbor cell.

14. A cell capable of providing cell type information in a mobile communication system, wherein the cell is configured to:
generate a neighbor cell identifier containing information regarding a type of the cell;
transmit the neighbor cell identifier to a user equipment (UE) to enable neighbor cell identification; and
perform access control for the UE based on an identification result of the UE for the neighbor cell, the cell comprising one of a macro cell and a femtocell, the femtocell configured to selectively operate in a plurality of access modes, the plurality of access modes comprising a closed access mode in which the femtocell serves only registered UEs, an open access mode in which the femtocell serves both registered UEs and non-registered UEs, and a hybrid access mode in which the femtocell can be operated in either of the closed access mode and open access mode, wherein to transmit the neighbor cell identifier, the cell is configured to:
determine, when the femtocell operates in the hybrid access mode, whether a registered user equipment is present in a service area;
transmit, when a registered user equipment is not present in the service area, a neighbor cell identifier indicating the open access mode; and
activate, when a registered user equipment is present in the service area, the closed access mode and transmit a neighbor cell identifier indicating the closed access mode.

15. The cell of claim 14, wherein the neighbor cell identifier is a Physical Cell Identity (PCI) classified by the type of the cell.

16. The cell of claim 14, wherein the neighbor cell identifier is transmitted through system information containing information regarding the cell type and access mode of the neighbor cell.

17. The cell of claim 14, wherein the neighbor cell identifier is a combination of a PCI and Closed Subscriber Group (CSG) indicator reflecting the cell type and access mode.

18. The cell of claim 14, wherein the neighbor cell identifier is a combination of a PCI and Home eNodeB (HNB) indicator reflecting the cell type and access mode.

19. The user equipment of claim 11, wherein the neighbor cell identifier is a combination of a PCI and Closed Subscriber Group (CSG) indicator reflecting the cell type and access mode.

20. The user equipment of claim 11, wherein the neighbor cell identifier is a combination of a PCI and Home eNodeB (HNB) indicator reflecting the cell type and access mode.

* * * * *